Patented Oct. 15, 1935

2,017,208

UNITED STATES PATENT OFFICE 2,017,208

IODATED HYDROXY DIPHENYL SULPHIDE AND METHOD OF PREPARING THE SAME

Treat Baldwin Johnson, Bethany, Conn., assignor to Sharp & Dohme, Incorporated, Baltimore, Md., a corporation of Maryland No Drawing. Application July 16, 1930,
Serial No. 468,468

12 Claims. (Cl. 260—150)

This invention relates to the preparation of iodated parahydroxydiphenyl sulphides and includes these new iodated compounds.

The iodated parahydroxydiphenyl sulphides are new compounds. None of these iodated compounds have previously been prepared so far as I am aware. The action of those compounds of this group which I have already prepared indicate that members of this group have valuable pharmacological properties and are of particular value because of their thyroxine-like action.

The iodated parahydroxydiphenyl sulphides which I have prepared include compounds in which one hydrogen atom, and compounds in which more than one hydrogen atom of one of the two benzene nuclei has been replaced by iodine. They include compounds in which iodine has been substituted in the same nucleus with the hydroxy group and also compounds in which the iodine has been substituted in the other benzene nucleus, also compounds in which the iodine has been substituted in the ortho and meta and also the para positions and derivatives thereof in which radicals such as the methyl group are substituted for hydrogen in the benzene nucleus.

Various processes have been employed for preparing these new compounds. The following examples are given as representative of the new processes and products of this invention, but it is intended and is to be understood that the invention is not limited thereto:

*Example 1.—4-hydroxy-2,6-di-iodo-diphenyl sulphide*

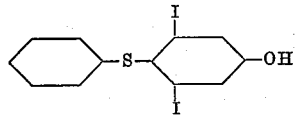

20 parts of 3, 4, 5-tri-iodo-nitrobenzene are suspended in 800 parts of boiling 90% alcohol and a solution containing one equivalent of sodium thiophenate is added. This solution is prepared by adding 0.92 part of sodium to 4.4 parts of thiophenate in 50 parts of alcohol. The tri-iodonitrobenzene rapidly dissolves and the solution acquires a light orange color. After heating under a reflux condenser for five hours, one-half of the alcohol is distilled off and the hot solution is then diluted with water. On cooling, a yield of about 86% of the pure nitro compound has been obtained. Two crystalline modifications will be observed; canary-yellow needles separate from warm 90% acetic acid solution, but slowly redissolve and separate on further cooling as orange rhomboids. Both forms melt at 105.5° C. and their mixture also melts at this temperature.

10 parts of this nitro compound, which is 4-nitro, 2, 6,-di-iodo-diphenyl sulphide is reduced by digesting for two hours with 26 parts of stannous chloride and 30 parts of hydrochloric acid (specific gravity 1.16) in 250 parts of alcohol. After evaporating the resulting solution under diminished pressure, the sirupy residue is dissolved in water and treated with an excess of 10% solution of sodium hydroxide. The precipitate is filtered by suction and the amine is extracted with boiling alcohol. The solution is decolorized with charcoal such as norite and then diluted with water. On cooling, colorless prisms of 4-amino-2,6,-di-iodo-diphenyl sulphide deposit. These melt at 146° C. A yield of 70% has been obtained. The hydrochloride which melts at 192° without decomposition is obtained by passing dry hydrogen chloride into an ether solution of the amine.

9 parts of the hydrochloride of the amino compound are suspended in 50 parts of glacial acetic acid and diazotized at 5–10° C. by interaction with 3 parts of normal butyl nitrite in 25 parts of glacial acetic acid. The deep red solution of the diazonium salt is diluted with an equal volume of water and added slowly to 200 parts of a mixture of equal volumes of concentrated sulfuric acid and water. The reaction solution is maintained at 135–140° C. during this operation. The phenol is separated from the tarry product resulting from this reaction by extraction with a mixture of 20% sodium hydroxide and alcohol. The alcoholic layer is filtered and the filtrate saturated with carbon dioxide. The solution is again filtered and then acidified with hydrochloric acid. The colorless oil that separates is dissolved in dilute alcohol and from this the phenol crystallizes in long prisms. A yield of about 3.4 parts has been obtained. The crystals contain 1 molecule of alcohol of crystallization (9.4%) and rapidly disintegrate to a fine powder when exposed to air. The crystals do not melt but dissolve in their alcohol of crystallization at 92–95° C. The powder melts at 139° C.

*Example 2.—4-hydroxy-2,6-di-iodo-phenyl-p-tolyl sulphide*

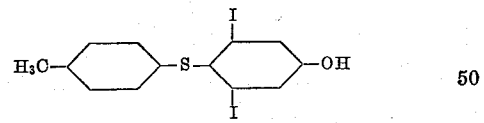

The tolyl derivative of Example 1 is prepared in a manner similar to that employed in the preparation of the compound of Example 1 except that in the preparation of 2-nitro-2,6,-di-iodo-phenyl-p-tolylsulphide, tri-iodo-nitrobenzene is employed with the sodium salt of thio-p-cresol instead of with sodium thio-phenate. A yield of 83% of the theoretical has been obtained. Two crystalline modifications were observed here also. Fan-shaped aggregates of light yellow needles crystallize from alcohol but redissolve and crystallize on cooling as yellow rhomboids. Both forms melt at 121–122° with preliminary softening at 120°.

The nitro-compound is reduced with stannous chloride in a manner similar to that described in Example 1 and the 4-amino-2,6,-di-iodo-phenyl-p-tolyl sulphide is obtained as colorless lance-shaped crystals which melt at 197–198°. A yield of about 70% of the theoretical has been obtained. The hydrochloride is obtained by passing dry hydrogen chloride into an ether solution of the amine. The hydrochloride melts at 182° with decomposition.

6 parts of the amine hydrochloride are diazotized with butyl nitrite and the solution of the diazonium salt is poured into one thousand parts of cold absolute ether. A red-brown powder separates and is filtered off. It is suspended in ice water and finally added to boiling sulphuric acid. The phenol formed is extracted with a mixture of 20% sodium hydroxide and alcohol. The alcoholic layer is filtered and the filtrate saturated with carbon dioxide. The solution is again filtered and then acidified with hydrochloric acid. A 25% yield of phenol has been obtained. It crystallizes from dilute alcohol in needles which melt at 154° C. It is soluble in dilute sodium hydroxide solution and dissolves in boiling 5% alcohol to the extent of 1 part in 20,000 but on cooling crystallizes from dilutions as high as 1 part in 80,000.

*Example 3.—3,5-di-iodo-4-hydroxydiphenyl-sulphide*

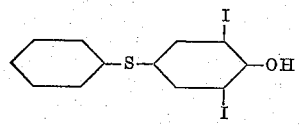

In my co-pending application Serial No. 260,817, filed March 10, 1928, now Patent No. 1,976,732 of October 16, 1934, I have described a method of preparing parahydroxydiphenyl-sulphide. 10 parts of this compound are dissolved in 450 parts of aqueous ammonia (specific gravity 0.9) and combine at 35–40° C. with 65 parts of 2.5 normal iodine solution. The ammonium salt of the di-iodated phenol separates in the form of colorless needles mixed with considerable tarry matter. The reaction product is separated by filtration, acidified to liberate the free phenol, the latter extracted from the tar by trituration with dilute sodium hydroxide and the alkaline solution decolorized by charcoal such as norite. On saturating the alkaline solution with carbon dioxide the phenol separates and is crystallized from dilute methyl alcohol. It crystallizes in long prisms which melt at 84–85°. A yield of about 7.5 parts has been obtained. The compound is extremely soluble in the common organic solvents and is very insoluble in water.

*Example 4.—3,5-di-iodo-4-hydroxy-4'-methyl-diphenyl-sulphide*

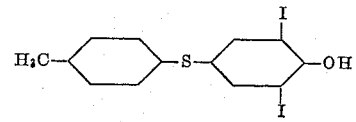

In my copending application above referred to I described a method of preparing the 4-hydroxy-4'-methyl-diphenyl sulphide. 10 parts of this compound is dissolved in 450 parts of aqueous ammonia (specific gravity 0.9) and combined at 35–40° with 65 parts of 2.5 normal iodine solution. The ammonium salt of the di-iodated-phenol separates in the form of colorless needles mixed with considerable tarry material. The reaction product is separated by filtration, acidified to liberate the free phenol, the latter extracted from the tar by trituration with dilute hydroxide and the alkaline solution is decolorized with animal charcoal such as norite. On saturating the alkaline solution with carbon dioxide phenol separates and is crystallized from dilute methyl alcohol in clusters of colorless needles which melt at 112–113°.

This application is in part a continuation of application Serial No. 260,817, filed March 10, 1928, now Patent No. 1,976,732 of Oct. 16, 1934.

I claim:
1. Iodated 4-hydroxy-diphenyl sulphides in which the iodine is in the meta position to the hydroxy group.
2. Iodated 4-hydroxy-diphenyl sulphides in which the iodine is in the ortho position to the hydroxy group.
3. 4-hydroxy-diphenyl sulphide with iodine in the phenol nucleus.
4. Di-iodo - 4 - hydroxy - diphenyl sulphides in which two of the hydrogens of the phenol nucleus are replaced by iodine.
5. 4-hydroxy-2,6,-di-iodo-diphenyl sulphide.
6. 4-hydroxy-2,6,-di-iodo-phenyl - p - tolyl sulphide.
7. 3,5-di-iodo-4-hydroxy-diphenyl sulphide.
8. 3,5-di-iodo - 4 - hydroxy-4'-methyl-diphenyl sulphide.
9. The method of preparing iodated diphenyl sulphides which comprises coupling a tri-iodo-nitrobenzene with a sodium thiophenate, reducing to the amine, and then preparing the phenol by first diazotizing.
10. The method of preparing iodated diphenyl sulphides which comprises dissolving a para-hydroxy-diphenyl sulphide in aqueous ammonia and combining it with iodine solution.
11. Symmetrical di-iodated 4-hydroxy-diphenyl sulphides in which two of the hydrogens of the phenol nucleus are replaced by iodine.
12. Symmetrical di-iodated hydroxy phenyl tolyl sulphides, in which two of the hydrogens of the phenol nucleus are replaced by iodine.

TREAT B. JOHNSON.

CERTIFICATE OF CORRECTION.

Patent No. 2,017,208.                                                      October 15, 1935.

TREAT BALDWIN JOHNSON.

It is hereby certified that error appears in the printed specification of the above numbered patent requiring correction as follows: Page 1, second column, line 53, for the example number "1" read 2; and that the said Letters Patent should be read with this correction therein that the same may conform to the record of the case in the Patent Office.

Signed and sealed this 19th day of November, A. D. 1935.

Leslie Frazer

(Seal)                                            Acting Commissioner of Patents.